P. NIEWIAROWSKI.
SIGNAL DEVICE FOR VEHICLES.
APPLICATION FILED SEPT. 25, 1919.
1,353,359.
Patented Sept. 21, 1920.
2 SHEETS—SHEET 1.
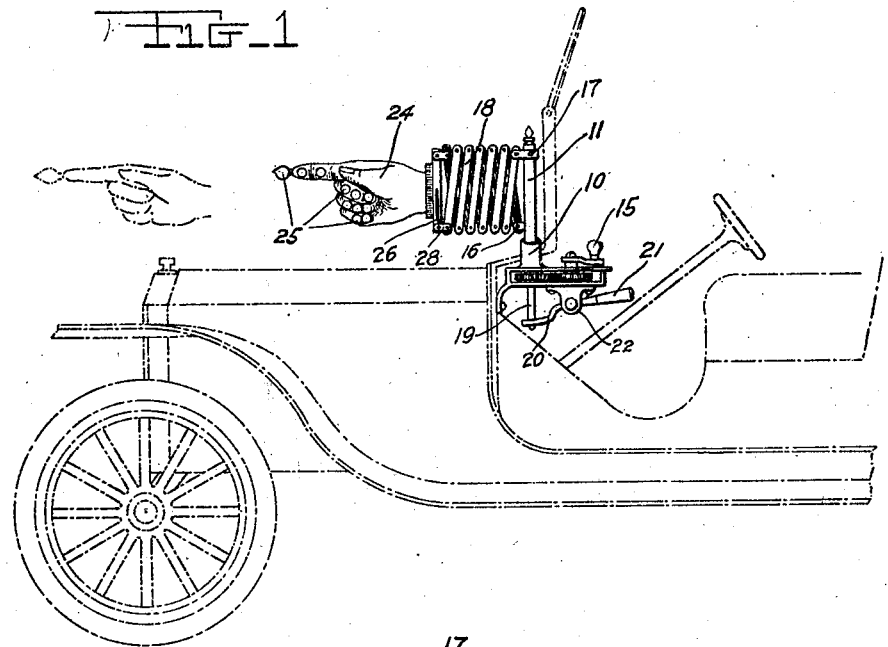
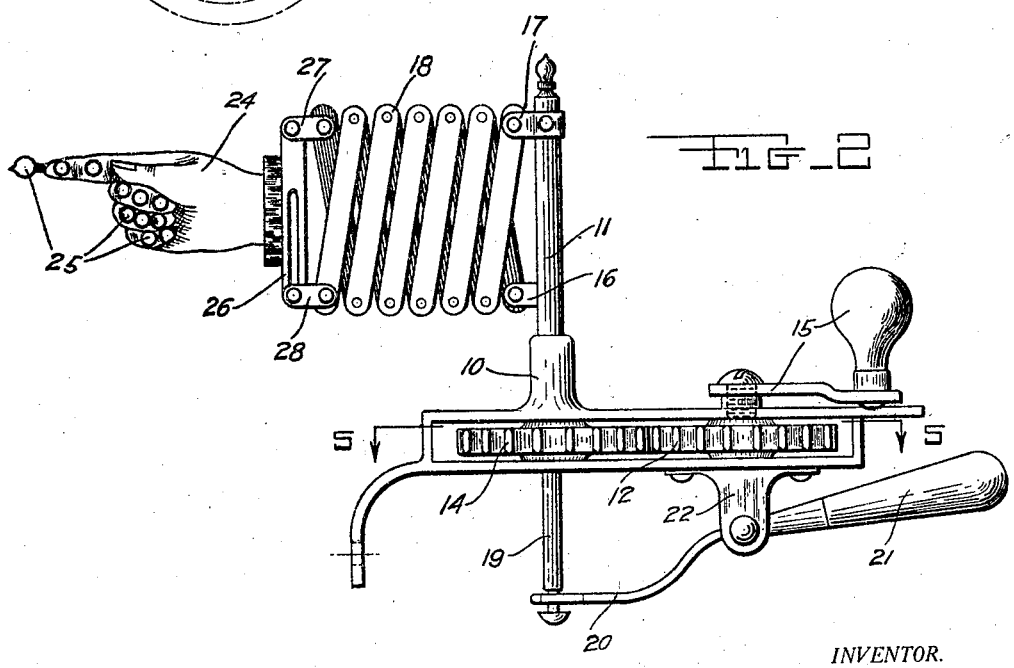
INVENTOR.
PIOTR NIEWIAROWSKI
BY
Adam E. Schatz
ATTORNEY.

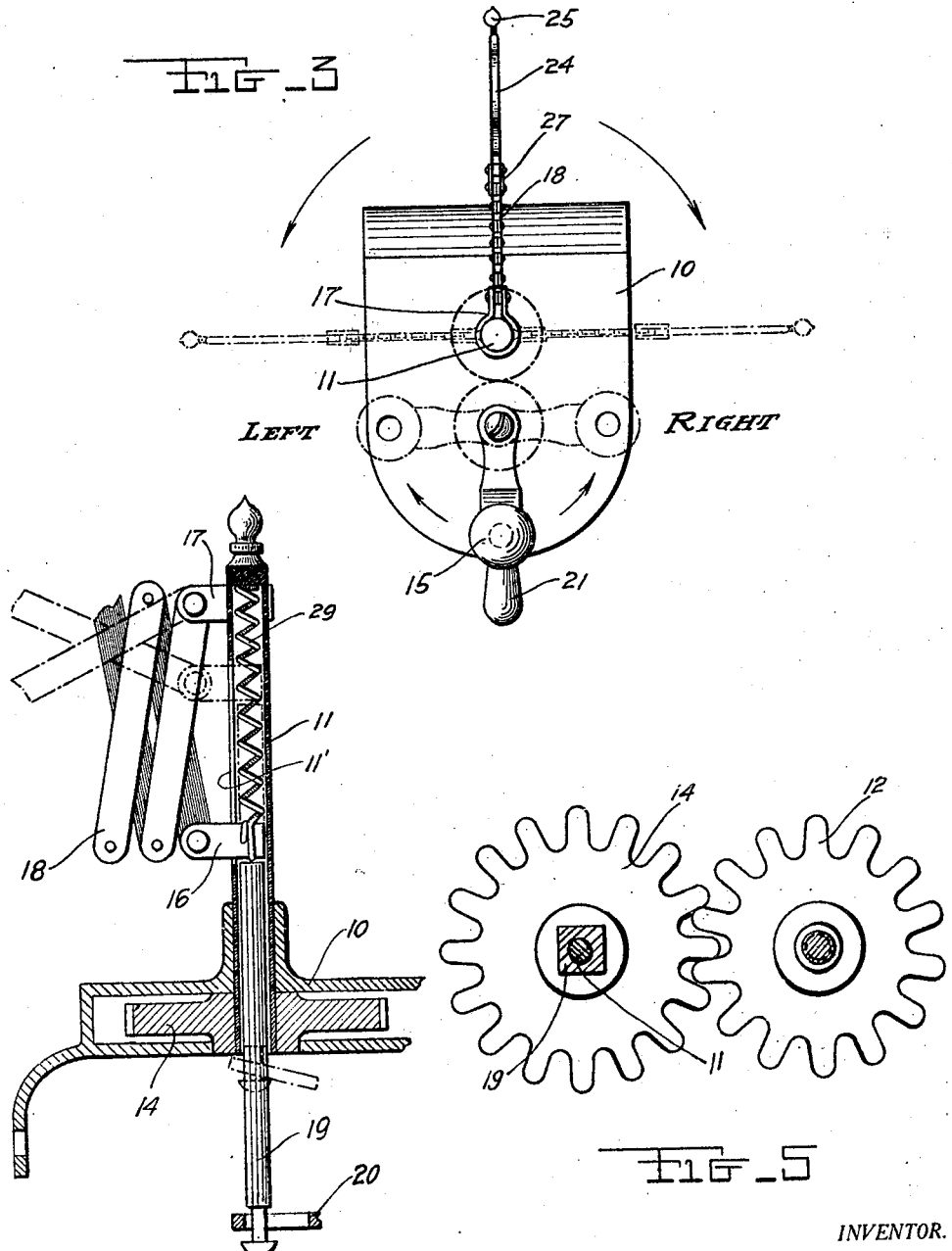

UNITED STATES PATENT OFFICE.

PIOTR NIEWIAROWSKI, OF OMAHA, NEBRASKA.

SIGNAL DEVICE FOR VEHICLES.

1,353,359.      Specification of Letters Patent.      Patented Sept. 21, 1920.

Application filed September 25, 1919. Serial No. 326,165.

*To all whom it may concern:*

Be it known that I, PIOTR NIEWIAROWSKI, a citizen of Poland, residing at Omaha, county of Douglas, and State of Nebraska, have invented certain new and useful Improvements in Signal Devices for Vehicles, of which the following is a specification.

This invention relates to signaling device, attachable to motor cars and other vehicles and readily controlled with the least effort by the operator or driver.

The purpose of this device is to indicate the intention of the operator as to the direction he is intending to proceed, going straight ahead or turning to right or left.

This object is attained by the novel construction and combination of parts hereinafter described and shown in the accompanying drawings, forming a material part of the specification, and in which—

Figure 1 is a side elevational view of the device, attached to motor car and made in accordance with the invention.

Fig. 2 is a side elevational view of the device in contracted or closed position.

Fig. 3 is a top plan view showing the signal arm in three different positions.

Fig. 4 is a vertical sectional view of the same, and,

Fig. 5 is a plan view of the gearing designed to rotate the signal.

Referring to the drawings in detail, the numeral 10 designates a frame or casing, through which extends a rotatably mounted upright tube 11, the lower end of which is keyed to the spur gear 12, held within the frame 10, in mesh with the gear 14 and positively rotated by means of a square stud to which is attached a suitable crank 15.

Passing through a slot 11' in upper section of tube 11 is a vertically slidable lug 16 which, in combination with the fixed lug 17, is pivotally attached to a system of simple levers, forming thereby an extensible lazy-tong arm 18, longitudinal movement being imparted to it by means of a rod 19, actuated vertically by the slotted member 20, of the lever 21 pivoted in a bracket 22, extending down from the frame 10.

A hand 24 for pointing direction, is provided with electrically connected sockets, fitted with low voltage electric lamps 25, affording means for illuminating the signal, and is attached to a bar 26, connected by suitable links 27 and 28, to the outer elements of the extensible arm 18.

In operation, upon depressing the lever handle 21, a longitudinal movement is transmitted to the arm 18, by the vertical travel of the rod 19, contactable with the lug 16, partially contained within the tube 11.

By reference to Fig. 2 it will be seen that rotary motion is imparted to the signal arm by rotating the crank 15 to the right which through the spur gears 12 and 14, causes a corresponding right hand turn of the signal hand, while a left hand turn of the crank causes a corresponding left turn of the signal.

Releasing the lever 21 permits expansion of the spring 29 within the tube 11, carrying with it the lug 16, effecting a contraction of arm 18, thereby withdrawing the signal hand 24 to its normal position.

Having thus described my invention and set forth the manner of its construction and application, what I claim as new and desire to secure by Letters Patent, is—

In a signal device for vehicles, the combination with a hollow frame adapted to be engaged with the front part of the vehicle, of a hollow, longitudinally slotted, vertical tube rotatable in said frame, a lug fixed on said tube, a second lug in said tube extending through the mentioned slot, a spring disposed between said lugs adapted to maintain them in a separated position, lazy-tong elements secured respectively to said lugs at one end, a visible signal mounted on the opposite end of said lazy-tong elements, a gear fixed to said tube within said frame, a second gear in mesh therewith a crank for manually rotating the last named gear, whereby said signal may be turned angularly, a handled lever fulcrumed below said frame, and operative connections between said lever and said sliding lug whereby it may be raised and said signal extended.

In testimony whereof I have affixed my signature.

PIOTR NIEWIAROWSKI.